United States Patent
Ahmed et al.

(10) Patent No.: US 7,036,329 B2
(45) Date of Patent: May 2, 2006

(54) LOWERING OF REFRIGERANT EMISSIONS BY CYCLING OF A VARIABLE DISPLACEMENT COMPRESSOR

(75) Inventors: S. Umair Ahmed, Charlottesville, VA (US); Edward I. Wolfe, IV, Amherst, NY (US); Prasad S. Kadle, Williamsville, NY (US); William J. Kumpf, Lockport, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/989,867

(22) Filed: Nov. 16, 2004

(65) Prior Publication Data

US 2005/0103031 A1 May 19, 2005

Related U.S. Application Data

(60) Provisional application No. 60/520,743, filed on Nov. 17, 2003.

(51) Int. Cl.
*B60H 1/32* (2006.01)
*F25B 31/00* (2006.01)

(52) U.S. Cl. ............................ 62/133; 62/157; 62/193; 62/228.5

(58) Field of Classification Search ................ 62/133, 62/157, 158, 231, 323.1, 323.4, 228.4, 228.5, 62/192, 193; 236/1 EA
See application file for complete search history.

(56) References Cited

U.S. PATENT DOCUMENTS

| | | | |
|---|---|---|---|
| 3,738,118 A | 6/1973 | Jacobs | |
| 4,480,443 A | 11/1984 | Nishi et al. | |
| 4,872,814 A | 10/1989 | Skinner et al. | |
| 5,323,619 A * | 6/1994 | Kim | 62/193 |
| 5,673,568 A * | 10/1997 | Isshiki | 62/157 |
| 6,145,325 A | 11/2000 | Hanselmann et al. | |
| 6,748,756 B1 * | 6/2004 | Kadle et al. | 62/228.5 |

* cited by examiner

*Primary Examiner*—Harry B. Tanner
(74) *Attorney, Agent, or Firm*—Patrick M. Griffin

(57) ABSTRACT

In order to reduce refrigerant leakage from an automotive air conditioning system, the leakage paths are kept sealed by automatically reducing the output of a variable displacement compressor (12) after initial operation of the engine for a predetermined number of five minutes, and then only for a predetermined number of ten seconds, that is, so long as there has been an air conditioning on signal by the operator. After the reduction in output for ten seconds, the output of the compressor (12) is returned to full output for a predetermined number of two air-conditioning minutes, which is then followed by another ten seconds of reduced output.

17 Claims, 4 Drawing Sheets

LOWERING OF REFRIGERANT EMISSIONS BY CYCLING OF A VARIABLE DISPLACEMENT COMPRESSOR

CROSS REFERENCE TO RELATED APPLICATION

This application claims the benefit of provisional application Ser. No. 60/520,743 filed Nov. 17, 2003.

BACKGROUND OF THE INVENTION

1. Field of the Invention

The subject invention relates to an air conditioning system for a vehicle, frequently referred to as a heating, ventilating and air conditioning (HVAC) system.

2. Description of the Prior Art

Such systems typically include a compressor for compressing a refrigerant, a condenser for condensing the refrigerant, an evaporator for evaporating the refrigerant, a discharge fluid line interconnecting the compressor and the condenser, a liquid fluid line interconnecting the evaporator and the condenser, and a suction fluid line interconnecting the evaporator and the compressor. Also, such systems utilize various valve arrangements for controlling flow through the system during operation and during shutdown and/or in response to a leak of refrigerant in the system. In addition, an accumulator/dehydrator is frequently disposed in the suction line for accumulating refrigerant.

As is known and supported by test data, refrigerant oil reduces refrigerant emissions from components in the compressor. More specifically, polymers and rubber components, such as lip seals and O-rings, exhibit significant reduction in refrigerant permeation and leakage when these components are coated with a film of oil. Such has been recognized in U.S. Pat. No. 3,738,118 to Jacobs.

In a pressure vessel that contains microscopic leak paths, refrigerant under pressure eventually displaces oil molecules in these leak paths. The pressure vessel develops a leak rate that is substantially higher than the leak rate when such leak paths are blocked with oil.

Consequently, the absence of refrigerant oil may also result in high rates of refrigerant emission. The phenomenon of "oil migration" can result in the complete absence of oil in the compressor. Should oil migration, which is dependent on thermal cycling, be permitted to continue for several thermal cycles, the compressor may be completely flushed of oil and emit refrigerant at a rate higher than when the compressor components are coated with oil.

During initial startup of variable compressors, very little oil returns to the rotating lip seal. This is due to the fact that very little suction gas (with oil) enters the crankcase where the rotating seal is located. Therefore, oil return does not occur until the compressor destrokes or cycles allowing the suction gas with oil to flow through the crankcase onto the rotating seal.

SUMMARY OF THE INVENTION AND ADVANTAGES

The subject invention provides an air conditioning system and method of engaging same that is of the type including a compressor for compressing a refrigerant, a condenser for condensing the refrigerant, an evaporator for evaporating the refrigerant, a discharge fluid line interconnecting the compressor and the condenser, a liquid fluid line interconnecting the condenser and the evaporator, and a suction fluid line interconnecting the evaporator and the compressor. The invention includes a controller for performing the steps of sequencing the compressor in response to the engine being in initial operation for a predetermined number of engine minutes and in response to an air conditioning on signal to reduce the output of the compressor for a predetermined number of seconds and to increase the output of the compressor for a predetermined number of air-conditioning minutes.

Accordingly, the limiting of refrigerant emissions is enhanced with a variable compressor air conditioning system in one of two ways. The first option would to be to destroke the compressor allowing the oil and suction gas to flow through the crankcase and onto the rotating seal. The second methodology would be to cycle the compressor off for a short period of time to allow the refrigerant to surge into the crankcase coating the seal with oil and refrigerant.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE INVENTION

Figure 1:
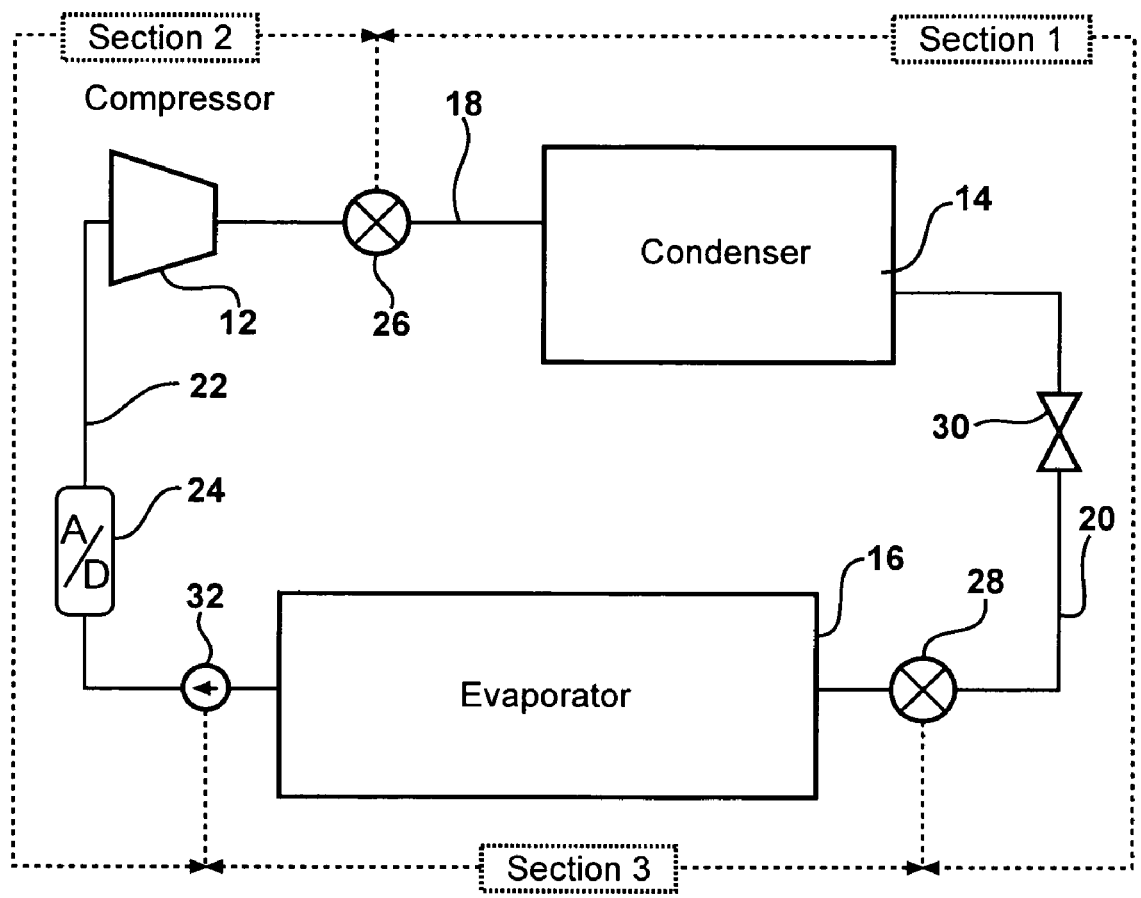
FIG. 1 is a schematic view of an air conditioning system employing the subject invention.
Figure 2:
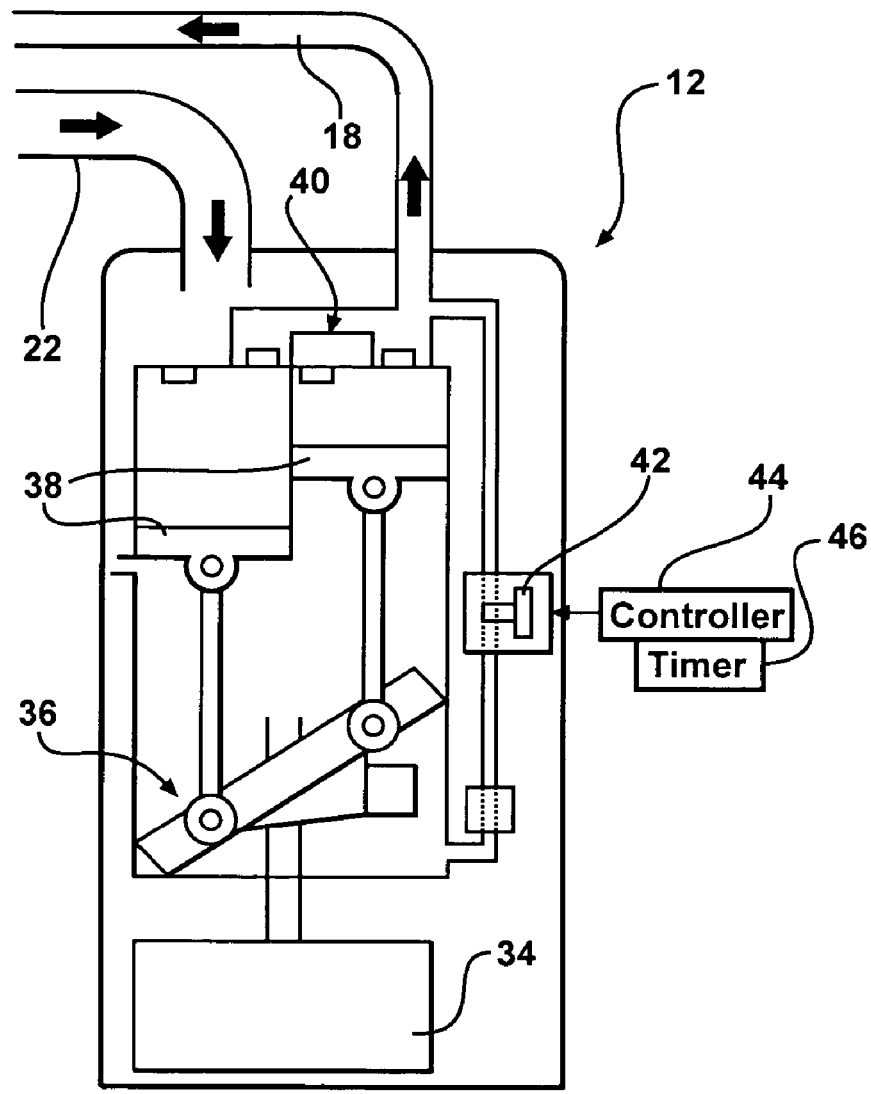
FIG. 2 is a schematic view of a compressor for implementing the subject invention.

As alluded to above, the subject invention relates to an air conditioning system for a vehicle that comprises a compressor 12 for compressing a refrigerant, a condenser 14 for condensing the refrigerant, and an evaporator 16 for evaporating the refrigerant. Of course, a discharge fluid line 18 interconnects the compressor 12 and the condenser 14, while a liquid fluid line 20 interconnects the condenser 14 and the evaporator 16, and a suction fluid line 22 interconnects the evaporator 16 and the compressor 12 (it being appreciated that FIG. 1 is not proportional as it is schematic).

As is well known in the art, an accumulator/dehydrator (A/D) 24 is disposed in the suction fluid line 22 for accumulating refrigerant.

In addition, various valves 26, 28 and 32 are included for controlling the flow of refrigerant through the system. A thermal expansion device 30 is also disposed in the liquid fluid line 20 between the condenser 14 and the evaporator 16. The expansion device is normally an orifice tube but generally could be replaced by any expansion device such as a capillary tube, TXV, etc. Of course, with the TXV, the A/D would be replaced by a receiver/dryer (R/D) that would be in the fluid line 20 between the condenser 14 and the expansion device 30.

Figure 3:
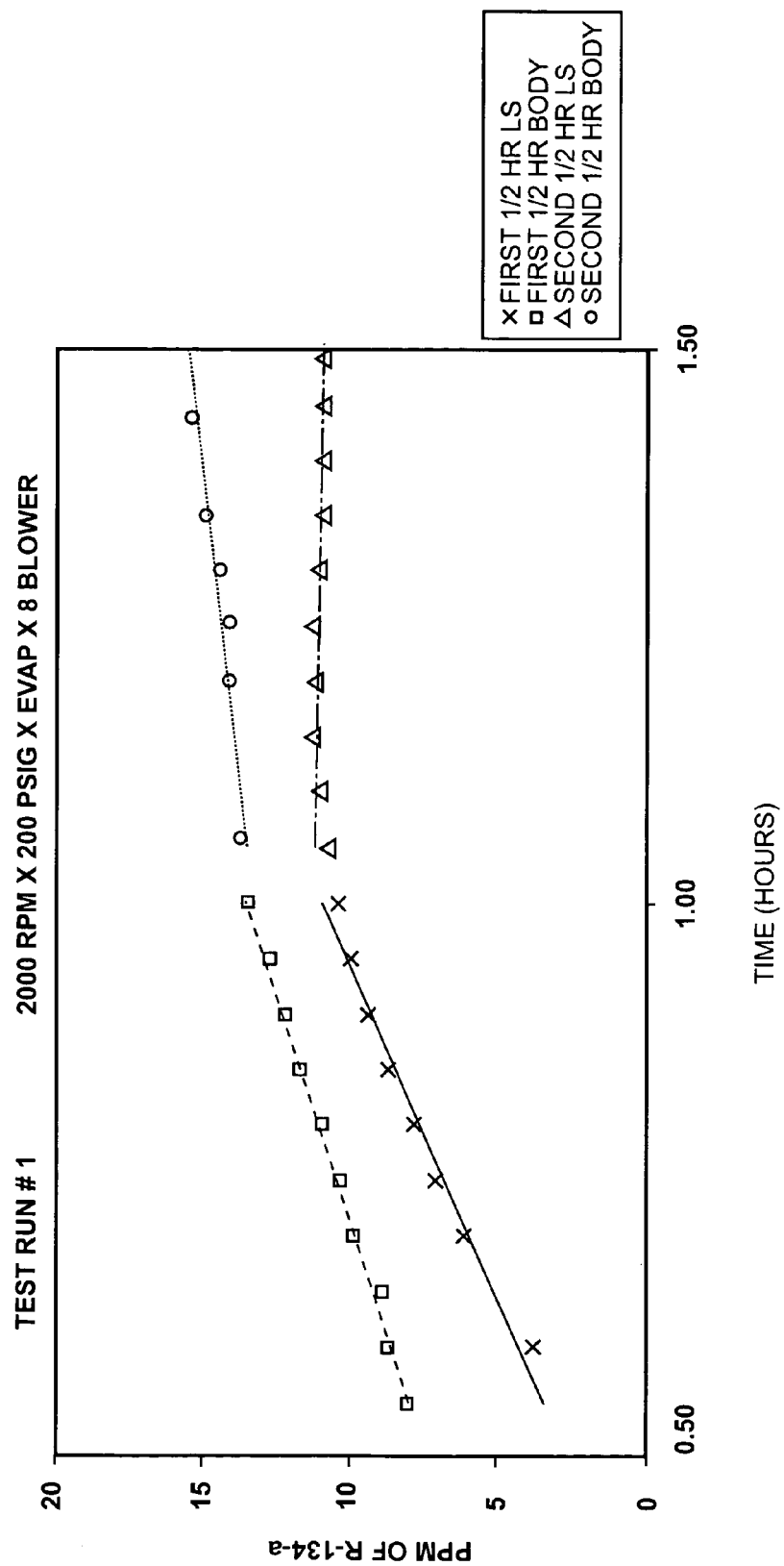
FIG. 3 is a bar graph of refrigerant leakage over time

This may be accomplished in an electronic variable stroke, i.e., variable displacement, compressor 12 as illustrated in FIG. 3. An example of a compressor that could be used to implement the subject invention is described in U.S. Pat. No. 6,247,900 granted Jun. 19, 2001 to Archibald et al.

Such a compressor 12 is well known in the art and includes an electric motor 34 for rotating a swash plate 36 to various angles to vary the stroke of a plurality of pistons 38. Various valves 40 control the flow into and out of the chambers surrounding the pistons 38 via the suction 22 and discharge 18 fluid lines, i.e., by varying the displacement. An electronic control valve 42 controls the angular position of the swash plate 36 to establish the length of stroke of the pistons 38 and, therefore, the displacement. The compressor may be controlled by pneumatic controller instead of an electronic controller.

The system includes a controller 44 for disengaging the compressor 12 in response to an engine being in initial operation and air conditioning on signal and for a predetermined length of time. In other words, the controller 44 sequences the compressor 12 in response to the engine being in initial operation for a predetermined number of engine minutes and in response to an air conditioning on signal to reduce the output of the compressor 12 for a predetermined number of seconds and to increase the output of the compressor 12 for a predetermined number of air-conditioning minutes.

Figure 4:
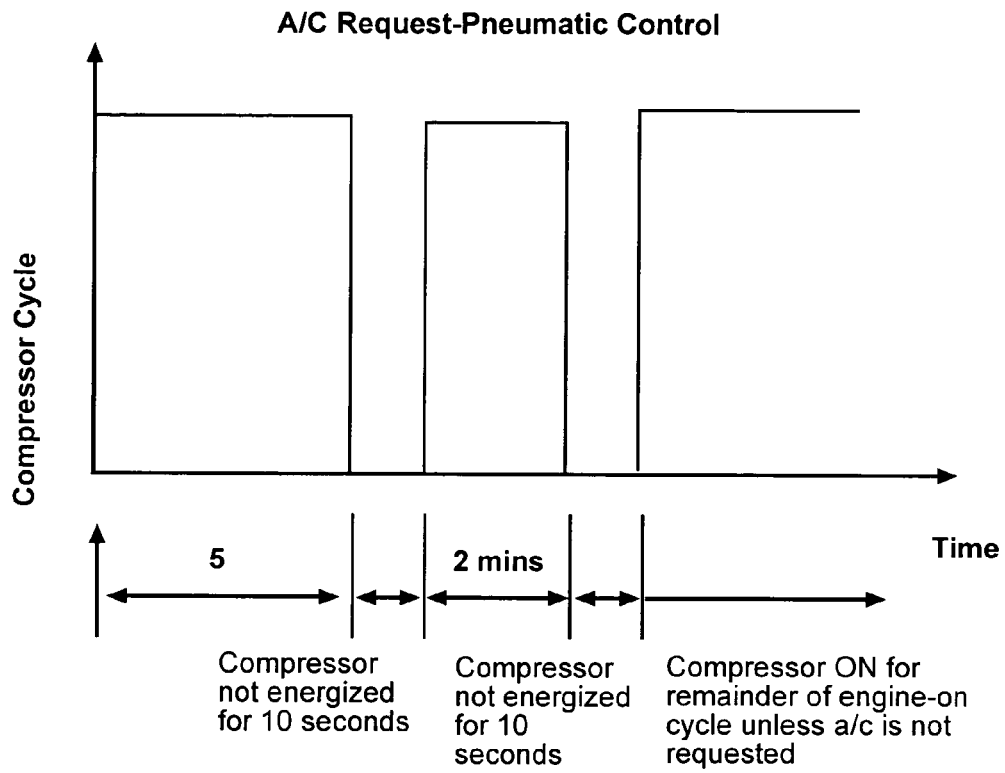
FIG. 4 is a chart of the operation of an pneumatically controlled variable displacement compressor operated in accordance with the subject invention.
Figure 5:
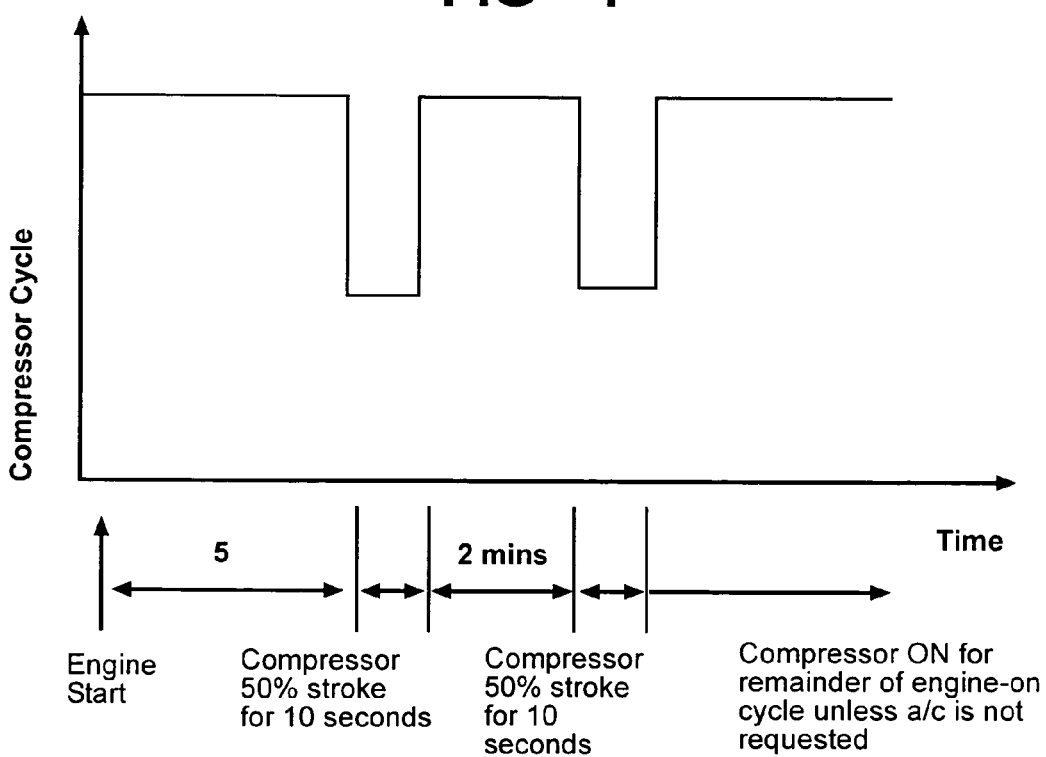
FIG. 5 is a chart of the operation of an electronically controlled variable displacement compressor operated in accordance with the subject invention.

The controller 44 includes a timer 46 for establishing the predetermined number of engine and air-conditioning minutes as five and the predetermined number of seconds as ten for air conditioning off or reduced output and the predetermined number of air-conditioning minutes as two and for providing a second predetermined number of seconds as ten following the two minutes of air-conditioning. This illustrated in FIGS. 4 and 5. In the embodiment of FIG. 4, the controller 44 is pneumatic and the output of the compressor 12 is reduced to zero whereas the embodiment of FIG. 5 illustrates an electronic controller 44 and engages the compressor 12 at a fifty percent duty cycle during the predetermined number of seconds of reduced output. The compressor 12 varies its displacement by being a variable stoke compressor 12 and the controller 44 is electronic and engages the compressor 12 at fifty percent of full stoke during the predetermined number of seconds of reduced output. In case of the electronically-controlled duty cycle, the shape of the curve in FIG. 5 can be changed to be a smoother curve than the square one shown such that the duty cycle is varied gradually. In both cases illustrated in FIGS. 4 and 5, the controller 44 operates by disengaging the compressor or reducing output 12 for a second predetermined number of ten seconds at the end of the predetermined number of two air-conditioning minutes.

Accordingly, when the vehicle operator turns the ignition on and starts the engine, and engages the air conditioning system, the timer 46 sets the predetermined number of five engine and air conditioning minutes, and so long as the operator initiates, or causes to be initiated, an air conditioning turn on signal during the five minutes, the controller 44 will operate turn off of reduce output to the compressor 12 for the predetermined number of ten seconds or destroke the compressor. The timer 46 will set another period of ten seconds at the end of the predetermined number of two air-conditioning minutes, after which the compressor will be continuously operated so long as the air conditioner is turned on.

Accordingly, the invention provides a method of disengaging such an air conditioning system including the step of sequencing the compressor 12 in response to the engine being in initial operation for a predetermined number of engine minutes and in response to an air conditioning on signal to reduce the output of the compressor 12 for a predetermined number of seconds and to increase the output of the compressor 12 for a predetermined number of air-conditioning minutes. The methodology establishes the predetermined number of engine and air conditioning minutes as five, and the predetermined number of seconds as ten and the predetermined number of air-conditioning minutes as two and establishing a second predetermined number of seconds as ten following the two minutes of air-conditioning minutes.

The method is further defined as electronically engaging the compressor 12 at a fifty percent duty cycle during the predetermined number of seconds of reduced output. More specifically, since the compressor 12 is a variable stoke compressor 12, the method is further defined as electronically engaging the compressor 12 at fifty percent of full stoke during the predetermined number of seconds of reduced output. Finally, the method is further defined as establishing a second predetermined number of ten seconds of reduced output of the compressor 12 at the end of the predetermined number of air-conditioning minutes.

The only other induced a/c system operation different from subject operation is referenced in U.S. Pat. No. 3,738,118 granted Jun. 12, 1973 to Jacobs et al. Such a system utilized turning the air conditioning system on every engine start cycle. This is almost the reverse of the subject invention. In those situations, the system is turned on, where this invention turns off the variable compressor to allow the oil to return to the rotating lip seal section.

In the normal operation of variable displacement compressors, oil is required to return to the compressor lip seal region in one of two ways. The first would to be to destroke the compressor allowing the oil and suction gas to flow through the crankcase and onto the rotating seal. The second would be to cycle the compressor off for a short period of time to allow the refrigerant to surge into the crankcase coating the seal with oil and refrigerant as illustrated. The effects of destroking the variable stroke compressor can be shown in the graph of FIG. 3. The compressor emission is near zero after the compressor destrokes and allows oil to return to the lip seal. The near zero emission continues even after the compressor returns to full stroke. Variable displacement compressors (induced a/c operation);

1) Confirm engine has been on of 5 minutes and confirm that a/c request was present in the preceding 5 minutes.
2) Disengage a/c compressor for 10 seconds. Rengage for 2 minutes. Disengage a/c compressor for 10 seconds again. Rengage. For electronically controlled compressors, set constant duty cycle of 50 percent during the 2.10 second runs. Note that for the case of the electronically—controlled duty cycle, the shape of the curve can be changed to be a smoother curve than the one shown so that the duty cycle is varied gradually.

Obviously, many modifications and variations of the present invention are possible in light of the above teachings. The invention may be practiced otherwise than as specifically described within the scope of the appended claims.

ELEMENT LIST

| Element Symbol | Element Name |
|---|---|
| 12 | compressor |
| 14 | condenser |
| 16 | evaporator |
| 18 | discharge fluid line |
| 20 | liquid fluid line |

-continued

ELEMENT LIST

| Element Symbol | Element Name |
| --- | --- |
| 22 | suction fluid line |
| 24 | accumulator/dehydrator |
| 26 | check valve |
| 28 | first solenoid-operated valve |
| 30 | second solenoid-operated valve |
| 32 | thermal expansion device |

What is claimed is:

1. An air conditioning system for a vehicle having an engine comprising:
    a variable displacement compressor (12) for compressing a refrigerant,
    a condenser (14) for condensing the refrigerant,
    an evaporator (16) for evaporating the refrigerant,
    a discharge fluid line (18) interconnecting the compressor (12) and said condenser (14),
    a liquid fluid line (20) interconnecting said condenser (14) and said evaporator (16),
    a suction fluid line (22) interconnecting said evaporator (16) and said compressor (12), and
    characterized by a controller for sequencing said compressor (12) in response to the engine being in initial operation for a predetermined number of engine minutes and in response to an air conditioning on signal to reduce the output of said compressor (12) for a predetermined number of seconds and to increase the output of said compressor (12) for a predetermined number of air-conditioning minutes.

2. A system as set forth in claim 1 wherein said controller includes a timer 46 for establishing said predetermined numbers.

3. A system as set forth in claim 1 wherein said controller includes a timer 46 for establishing said predetermined number of engine minutes as five.

4. A system as set forth in claim 1 wherein said controller includes a timer 46 for establishing said predetermined number of engine minutes as five and said predetermined number of seconds as ten.

5. A system as set forth in claim 1 wherein said controller includes a timer 46 for establishing said predetermined number of minutes as five and said predetermined number of seconds as ten and said predetermined number of air-conditioning minutes as two.

6. A system as set forth in claim 1 wherein said controller includes a timer 46 for establishing said predetermined number of engine minutes as five and said predetermined number of seconds as ten and said predetermined number of air-conditioning minutes as two and for providing a second predetermined number of seconds as ten following the two minutes of air-conditioning minutes.

7. A system as set forth in claim 1 wherein said controller is electronic and engages said compressor (12) at a fifty percent duty cycle during said predetermined number of seconds of reduced output.

8. A system as set forth in claim 1 wherein said compressor (12) is a variable stoke compressor (12) and said controller is electronic and engages said compressor (12) at fifty percent of full stoke during said predetermined number of seconds of reduced output.

9. A system as set forth in claim 1 wherein said controller operates said compressor (12) for a second predetermined number of seconds at the end of said predetermined number of air-conditioning minutes.

10. A method of engaging an air conditioning system of the type including a variable displacement compressor (12) for compressing a refrigerant, a condenser (14) for condensing the refrigerant, an evaporator (16) for evaporating the refrigerant, a discharge fluid line (18) interconnecting the compressor (12) and the condenser (14), a liquid fluid line (20) interconnecting the condenser (14) and the evaporator (16), and a suction fluid line (22) interconnecting the evaporator (16) and the compressor (12), said method characterized by comprising the steps sequencing the compressor (12) in response to the engine being in initial operation for a predetermined number of engine minutes and in response to an air conditioning on signal to reduce the output of the compressor (12) for a predetermined number of seconds and to increase the output of the compressor (12) for a predetermined number of air-conditioning minutes.

11. A method as set forth in claim 10 further defined as establishing the predetermined number of engine minutes as five.

12. A system as set forth in claim 10 further defined as establishing the predetermined number of engine minutes as five and the predetermined number of seconds as ten.

13. A system as set forth in claim 10 further defined as establishing the predetermined number of minutes as five and the predetermined number of seconds as ten and the predetermined number of air-conditioning minutes as two.

14. A system as set forth in claim 10 further defined as establishing the predetermined number of engine minutes as five and the predetermined number of seconds as ten and the predetermined number of air-conditioning minutes as two and establishing a second predetermined number of seconds as ten following the two minutes of air-conditioning minutes.

15. A system as set forth in claim 10 further defined as electronically engaging the compressor (12) at a fifty percent duty cycle during the predetermined number of seconds of reduced output.

16. A system as set forth in claim 10 wherein said compressor (12) is a variable stoke compressor (12) and further defined as electronically engaging the compressor (12) at fifty percent of full stoke during the predetermined number of seconds of reduced output.

17. A system as set forth in claim 10 further defined as establishing a second predetermined number of seconds of reduced output of the compressor (12) at the end of the predetermined number of air-conditioning minutes.

* * * * *